United States Patent
St. Clair et al.

(10) Patent No.: US 7,560,503 B2
(45) Date of Patent: Jul. 14, 2009

(54) GELS FROM HIGH MOLECULAR WEIGHT BLOCK COPOLYMERS

(75) Inventors: David J. St. Clair, Houston, TX (US); Willem C. Vonk, Amsterdam (NL); Cornelis Martinus van Dijk, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 259 days.

(21) Appl. No.: 10/860,191

(22) Filed: Jun. 3, 2004

(65) Prior Publication Data

US 2005/0272849 A1 Dec. 8, 2005

(51) Int. Cl.
C08L 53/02 (2006.01)
C08K 5/04 (2006.01)
C08K 5/07 (2006.01)
C08K 5/37 (2006.01)
A01N 25/08 (2006.01)
A01N 25/00 (2006.01)
C08L 95/00 (2006.01)
B61C 15/00 (2006.01)
C08F 297/04 (2006.01)
C11C 5/00 (2006.01)
C08K 5/13 (2006.01)
C08K 5/16 (2006.01)

(52) U.S. Cl. .................. 524/474; 44/265; 44/275; 44/459; 525/314; 525/89; 525/250; 525/271; 525/342; 525/289; 525/272; 525/93; 525/122; 525/123; 132/321; 524/476; 524/490; 524/505; 524/95

(58) Field of Classification Search ......... 524/502, 524/474, 476, 490; 525/342, 289, 272, 314; 44/275, 265, 459

See application file for complete search history.

(56) References Cited

U.S. PATENT DOCUMENTS

| | | | |
|---|---|---|---|
| 3,149,182 A | | 9/1964 | Porter |
| 4,107,131 A | | 8/1978 | Gergen et al. |
| 4,163,764 A | * | 8/1979 | Nash .......................... 524/151 |
| 4,612,348 A | * | 9/1986 | Sun ............................. 525/86 |
| 4,755,545 A | | 7/1988 | Lalwani |
| 4,813,947 A | * | 3/1989 | Korpman ..................... 604/387 |
| 5,182,319 A | | 1/1993 | Mitchell |
| 5,266,648 A | * | 11/1993 | Masse ......................... 525/314 |
| 5,334,646 A | | 8/1994 | Chen |
| 5,578,089 A | * | 11/1996 | Elsamaloty .................. 44/275 |
| 5,693,718 A | * | 12/1997 | De Groot et al. ............ 525/314 |
| 5,773,496 A | * | 6/1998 | Grubba ........................ 524/68 |
| 5,879,694 A | * | 3/1999 | Morrison et al. ............ 424/405 |
| 5,884,639 A | * | 3/1999 | Chen .......................... 132/321 |
| 6,150,439 A | | 11/2000 | Keiichi et al. |
| 6,340,467 B1 | * | 1/2002 | Morrison ..................... 424/405 |
| 6,437,014 B1 | * | 8/2002 | Ho et al. ...................... 522/75 |
| 2002/0069580 A1 | * | 6/2002 | Wilson ........................ 44/275 |

FOREIGN PATENT DOCUMENTS

| | | | |
|---|---|---|---|
| DE | 203 10 484 | | 11/2003 |
| EP | 1 348 737 | | 10/2003 |
| GB | 2 318 121 | | 4/1998 |
| WO | WO-95/02640 | * | 1/1995 |
| WO | WO 95/02640 | * | 1/1995 |
| WO | 02/26889 | | 4/2002 |

* cited by examiner

*Primary Examiner*—Duane Smith
*Assistant Examiner*—Ives Wu
(74) *Attorney, Agent, or Firm*—Michael A. Masse; Novak, Druce & Quigg LLP

(57) ABSTRACT

The present invention relates to gels prepared from novel anionic block copolymers of aromatic vinyl compounds and conjugated dienes. The block copolymers include a high molecular weight linear and/or radial block copolymer component (SBC1 and/or SBC2), and a diblock component (E1). The block copolymer may be combined with tackifying resins, oils and other components to form the gels of the present invention.

18 Claims, No Drawings

GELS FROM HIGH MOLECULAR WEIGHT BLOCK COPOLYMERS

BACKGROUND OF THE INVENTION

1. Field of the Invention

This invention relates to gels prepared from novel anionic block copolymers of aromatic vinyl compounds and conjugated dienes.

2. Background of the Art

The preparation of block copolymers of aromatic vinyl compounds and conjugated dienes is well known. One of the first patents on linear ABA block copolymers made with styrene and butadiene is U.S. Pat. No. 3,149,182. Such polymers are broadly termed Styrenic Block Copolymers or SBC's.

SBC's have a long history of use as adhesives, sealants and gels. A recent example of such a gel can be found in U.S. Pat. No. 5,879,694. With the increased use of oil gels, the need for improved properties continues to exist. Such gels may also be used, for example, as a water proofing encapsulant/sealant for electronics and in wire and cable applications. Many gels have deficiencies in their properties, such as too low of a low softening point that limits certain end-use applications. Accordingly, it would be helpful to have gels which when molded have an appropriate hardness, but will not soften at use temperatures.

Applicant has found that certain new and novel polymers will allow the preparation of improved oil gels. In particular, the gels containing the presently claimed high molecular weight polymer composition have much higher ring & ball softening point than oil gels at the same gel hardness (i.e. same polymer content)—the prior art gels being based on similar polymers but having a lower molecular weight.

SUMMARY OF THE INVENTION

In one aspect of the present invention I have discovered a novel oil gel composition comprising 100 parts by weight of a block copolymer composition having (i) a high molecular weight linear and/or radial multiblock copolymer component along with (ii) a lower molecular weight diblock component, and 300 to about 2000 parts by weight of an extender oil.

The gels of the present invention are used, for example, as a water proofing encapsulant/sealant for electronics and in wire and cable applications, shoe inserts, toys, novelty items, cushions, rests and damping applications.

DETAILED DESCRIPTION OF THE PREFERRED EMBODIMENTS

The key component of the present invention is the novel block copolymer composition. The novel block copolymer composition comprises a high molecular weight styrenic block copolymer combined with a low molecular weight elastomer, preferably a diblock polymer. Preferably, the styrenic block copolymer has a molecular weight in the range of 250,000 to 800,000 if said copolymer is a linear polymer, or in the range of 500,000 to 1,500,000 if said copolymer is a branched or star-shaped polymer. Most preferably the styrenic block copolymer constituents are selected from the group consisting of

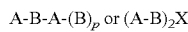

wherein A represents the polymer block substantially made of an aromatic vinyl compound, typically a polystyrene block; B represents a polymer block substantially made of a conjugated diene, typically a polybutadiene block, p is 0 or 1 and X is the residue of a coupling agent.

These preferred styrenic block copolymer constituents are selected from a larger group of styrenic block copolymers, that all may be used in the compositions of the present invention, consisting of those of the formulae

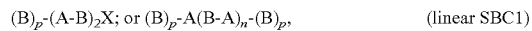  (linear SBC1)

  (radial SBC2)

wherein A, B, p and X have the meaning set out above, n is an integer greater than or equal to 1, and m is an integer greater than 2.

The expression "substantially" as used herein means that sufficient vinyl aromatic compound is used, for instance at least 50% by weight, to provide a hard block A having a glass transition temperature of greater than 25° C., whereas in terms of the block B the expression "substantially" means that sufficient conjugated diene is used, for instance at least 70% by weight, to provide an elastomer block having a glass transition temperature below 25° C.

The content of the vinyl aromatic compound in the styrenic block copolymer is from 10 to 50% by weight, preferably from 15 to 40% by weight.

The vinyl aromatic compound may be selected from compounds having 8 to 18 carbon atoms per molecule. For instance, some representative examples thereof include: styrene; 1-vinylnaphthalene; 3-methylstyrene; 3,5-diethylstyrene; 4-propylstyrene; 2,4,6-trimethylstyrene; 4-dodecylstyrene; 3-methyl,5-n-hexylstyrene; 4-phenylstyrene; 2-ethyl,4-benzylstyrene; 2,3,4,5-tetraethylstyrene; 3-ethyl-1-vinylnaphthalene; alpha-methylstyrene, and the like. Preferred examples comprise 3-methylstyrene, styrene and mixtures thereof, styrene being most preferred. Compounds that may be copolymerized and form part of the A block(s) may be selected from the conjugated dienes hereafter, and other anionically polymerizable, ethylenically unsaturated compounds, such as vinylcyclohexane, methylmethacrylate and the like. Most preferably each polymer block A is a polystyrene block.

Block B is preferably made from butadiene, isoprene or mixtures thereof. Conjugated dienes that can be used, preferably having from 4 to 12 carbon atoms per molecule, further include 2,3-dimethyl-1,3-butadiene, piperylene, 3-butyl-1,3-octadiene, phenyl-1,3-butadiene, and the like. Said block(s) may also comprise other monomers, such as the vinyl aromatic compounds mentioned herein above. Most preferably block B is a polybutadiene block.

As is known, butadiene (and other conjugated dienes) may polymerize in 1,4-addition manner and/or 1,2-addition manner. The latter results in pendant vinyl groups. It is known in the art to use styrenic block copolymers having relatively high vinyl content, e.g. up to 70% and higher (based on the conjugated diene), e.g. by polymerizing the conjugated diene monomer in the presence of a polar cosolvent and/or at a relatively cool polymerization temperature. In producing the polymer block (B) under ordinary conditions a vinyl content of less than 25% is obtained. Both high vinyl and ordinary styrenic block copolymers may be used.

Styrenic block copolymer and elastomers may be used in relative amounts of 15 to 70% by weight (SBC1 and/or SBC2) and 85 to 30% by weight (E1), respectively, but preferably in relative amounts 20 to 50% by weight (SBC1 and/or SBC2) and 80 to 50% by weight (D1). Most preferably, the relative amounts are selected within the aforementioned range on the basis of some scouting experiments, to compensate for the effect of the molecular weights of these components and the effect of the blend.

Depending on their method of preparation these SBC's are known to comprise diblock copolymers of formula A-B in various amounts. Indeed, in coupling reactions, the diblock copolymers of formula A-B have the same molecular weight as the arms in the coupled polymer. The co-produced diblock copolymer of formula A-B may be the low molecular weight elastomer (E1) component of the polymer composition, provided it has a molecular weight in the range of from 10,000 to 250,000 and is present in an amount in the range of 85 to 30% by weight basis the polymer composition. This is the preferred embodiment. On the other hand, elastomer (E1) may be a separate polymer, selected from the polymers mentioned herein before. Elastomer (E1) may also be a diblock copolymer produced independent of the preparation of the styrenic block copolymer (SBC1 and/or SBC2).

The polymer composition that has been found to be most suitable for the present application is a high mol weight styrene-butadiene-styrene coupled block copolymer with a large amount of di-block, with the following characteristics:
1. styrene content in the range of 25-40%, preferably about 30% by weight;
2. diblock molecular weight 180,000-215,000, preferably about 200,000;
3. diblock content 70-85%, preferably 80% by weight (which corresponds with a coupling efficiency of 15-30, preferably 20%); and
4. having a linear structure (manufactured with a difunctional coupling agent), having an apparent molecular weight (SBS) of 30,000-40,000//300,000-350,000//30,000-40,000, preferably 36,000-328,000-36,000. With the term "apparent molecular weight", as used throughout the present specification, is meant the molecular weight, as measured by means of Gel Permeation Chromatography (GPC), relative to commercially available poly(styrene) calibration standards (according to ASTM D6474-99). One skilled in the art can readily convert "apparent" molecular weight to "real" or "true" molecular weight according to known compositionally dependent conversions. For example, a styrene/butadiene block copolymer having the structure $(S-B)_2X$ with apparent molecular weight of $(36,000-164,000)_2X$ and 30% weight bound styrene will have a real molecular weight of $(36,000-84,000)_2X$.

One of the components used in the gels of the present invention is a polymer extending oil or plasticizer. Especially preferred are the types of oils that are compatible with the elastomeric segment of the block copolymer. While oils of higher aromatic content are satisfactory, those petroleum-based white oils having less than 50% aromatic content are preferred. Such oils include both paraffinic and naphthenic oils. The oils should additionally have low volatility, preferably having an initial boiling point above about 500° F.

Examples of alternative plasticizers which may be used in the present invention are oligomers of randomly or sequentially polymerized styrene and conjugated diene, oligomers of conjugated diene, such as butadiene or isoprene, liquid polybutene-1, and ethylene-propylene-diene rubber, all having a number average molecular weight in the range from 300 to 35,000, preferable less than about 25,000 molecular weight.

The amount of oil or plasticizer employed varies from about 300 to about 2000 parts by weight per hundred parts by weight rubber, or block copolymer, preferably about 400 to about 1000 parts by weight.

Various types of fillers and pigments can be included in the gel formulations to color the gel, increase stiffness and reduce cost. Suitable fillers include calcium carbonate, clay, talc, silica, zinc oxide, titanium dioxide and the like. The amount of filler usually is in the range of 0 to 30% weight based on the polymer portion of the formulation, depending on the type of filler used and the application for which the gel is intended. An especially preferred filler is silica.

The compositions of the present invention may be modified further with the addition of other polymers in particular polyolefins such an polyethylenes and polypropylenes, reinforcements, antioxidants, stabilizers, fire retardants, anti blocking agents, lubricants and other rubber and plastic compounding ingredients without departing from the scope of this invention. Such components are disclosed in various patents including U.S. Pat. Nos. 3,239,478; and 5,777,043, the disclosures of which are incorporated by reference.

Regarding the relative amounts of the various ingredients, this will depend in part upon the particular end use and on the particular block copolymer that is selected for the particular end use. Table A below shows some notional compositions that are included in the present invention. The block copolymer and oil amounts are expressed in parts by weight. If polyethylene or filler are used, they may be used at levels shown as a percent by weight of the polymer component.

TABLE A

Applications, Compositions and Ranges

| Application | Ingredients | Composition, |
|---|---|---|
| Oil gel | Block Copolymer | 100 pbw |
| | Oil | 300 to 2000 pbw |
| | Polyethylene | 0 to 80 wt % |
| | Fillers | 0 to 30 wt % |

The oil gels or gelatinous elastomer compositions of the present invention are useful in a number of applications, including low frequency vibration applications, such as viscoelastic layers in constrained-layer damping of mechanical structures and goods, as viscoelastic layers useful for isolation of acoustical and mechanical noise, as antivibration elastic support for transporting shock sensitive loads, etc. The compositions are also useful as molded shape articles for use in medical and sport health care, such use including therapeutic hand exercising grips, crutch cushions, cervical pillows, bed wedge pillows, leg rest, neck cushion, mattress, bed pads, elbow padding, wrist rests for computers, wheelchair cushions, soft toys and the like. See, for example, U.S. Pat. No. 5,334,646.

EXAMPLES

The following examples are provided to illustrate the present invention. The examples are not intended to limit the scope of the present invention and they should not be so interpreted. Amounts are in weight parts or weight percentages unless otherwise indicated. The test methods used in the examples are American Society for Testing Materials (ASTM) test methods, and the following specific method was used:

| Melt Viscosity | ASTM D-3236 |
|---|---|
| Ring & Ball Softening Point | ASTM D-36 |
| Tensile Properties | ASTM D-412 |

Example 1

In Example 1, two batches of a block copolymer of the present invention were prepared. In the first step, the styrene block (A) was polymerized with a sec-butyl initiator in a reactor, resulting in a polystyrene block having a molecular weight of about 36,000 daltons. Then 1,3-butadiene was added to prepare the butadiene block (B). The diblock copolymer was then coupled with an Epon 826 epoxy coupling agent. The polymers had the following characteristics:

|  | Polymer # 419-011 | Polymer # 420-011 |
| --- | --- | --- |
| Percent Styrene (wt) | 30.2% | 29.9% |
| A-B mol weight | 196,900 | 203,100 |
| $(A-B)_2$ mol weight | 400,200 | 408,900 |
| Coupling Efficiency | 21.4% | 20.3% |

The polymer used in the Examples was #420-111 and is designated Polymer #1. Accordingly, Polymer #1 is a mixture of an $(S-B)_2$ linear polymer and an S-B diblock copolymer, where the S block is a polystyrene block having about 36,000 dalton molecular weight and the B block is a polybutadiene block having about 167,000 dalton molecular weight. The polymer composition comprises about 20 parts by weight of the linear polymer and about 80 parts by weight of the diblock, corresponding to a 20% coupling efficiency.

Example 2

In Example 2, the polymer produced in Example 1 (Polymer #1) is compared against two other prior art polymers in oil gel compositions. CP-1 is similar to Polymer #1, except that it has much lower molecular weight. CP-1 has molecular weights of 16,000 for the S block and 37,000 for the B block, giving an overall polystyrene content of about 31% weight. The coupling efficiency for the CP-1 polymer is also about 20%. CP-2 is a more conventional styrene/butadiene block copolymer, having the structure $(S-B)_2$ and S-B for the diblock, where the diblock content is 18% and the linear polymer content is 82% by weight. The S block has a molecular weight of about 16,000 daltons and the B block has a molecular weight of about 37,000 daltons, similar to CP-1.

In Example #2, various gels were prepared with varying amounts of SHELLFLEX® 371, a low aromatic content, paraffinic/naphthenic extending oil having a viscosity of 93 centistokes at 40° C. and an initial boiling point of 310° C., supplied by Shell Oil Company. These blends were prepared by mixing with a Silverson rotor/stator type mixer operated at about 2,000 rpm for about 60 minutes at 130° C. Comparisons can be made at the 6% weight level for polymer in the gel, as shown in the Table below. Results show that Polymer #1 according to the invention and CP-1 according to the prior art at 6% in the oil give very soft (Bloom hardness of 9-12), tacky gels, while CP-2 according to the prior art gives a harder, rubbery gel that has no tack when touched with a finger. This difference between Polymer #1/CP-1 and CP-2 is because Polymer #1 and CP-1 have 80% diblock, while CP-2 has only about 18% diblock. Results also show that the viscosity of the gel containing 6% Polymer #1 according to the invention is much higher and more dependent on rpm (shear rate) than the gels containing CP-1 or CP-2. As shown below, oil gels according to the present invention have much higher ring & ball softening point than oil gels based on CP-1 or CP-2 at the same polymer content.

| Comparison of Block Copolymers in Oil Gels | | | | | | | | | |
| --- | --- | --- | --- | --- | --- | --- | --- | --- | --- |
|  | 1 | 2 | 3 | 4 | 5 | 6 | 7 | 8 | 9 |
| Composition, % w | | | | | | | | | |
| Polymer #1 | 4 | 6 | 7.5 | | | | | | |
| CP-2 | | | | 6 | 10 | 15 | | | |
| CP-1 | | | | | | | 6 | 10 | 15 |
| SHELLFLEX 371 | 95.5 | 93.5 | 92.0 | 93.5 | 89.5 | 84.5 | 93.5 | 89.5 | 84.5 |
| IRGANOX 1010 | 0.5 | 0.5 | 0.5 | 0.5 | 0.5 | 0.5 | 0.5 | 0.5 | 0.5 |
| R&B Softening Point, ° C. | 60 | 88 | a) | 72 | 83 | 91 | 63 | 72 | 82 |
| Melt Vis @ 120° C., Pa.s | | | | | | | | | |
| @ 100 rpm | 1.0 | 5.5 | | 0.11 | 0.20 | 2.07 | 0.02 | 0.10 | 0.58 |
| @ 50 rpm | 1.1 | 7.0 | | 0.16 | 0.20 | 2.04 | | 0.10 | 0.56 |
| @ 20 rpm | 1.2 | 9.1 | | | | | | | |
| Bloom Hardness, gm | 8 | 12 | | 50 | 124 | 334 | 9 | 30 | 74 |
| Tack | very tacky | very tacky | | none | none | none | very tacky | tacky | tacky | a) Viscosity was too high to mix with Silverson, even at 165° C.

What is claimed:

1. An oil gel composition comprising 100 parts by weight of a block copolymer composition and about 300 to about 2000 parts by weight of an extending oil, said block copolymer composition comprising:
   a. from 5 to 70% by weight of a first block copolymer selected from linear styrenic block copolymers (SBC1), radial styrenic block copolymers (SBC2) and mixtures thereof, wherein:
      i) said linear block copolymer comprises at least two polymer blocks each substantially made of an aromatic vinyl compound and at least one polymer block substantially made of a conjugated diene compound and having an apparent molecular weight of from 360,000 to 430,000 and;
      ii) said radial styrenic block copolymer has three or more polymer arms attached to the residue of a crosslinking agent or multifunctional compound, and comprises at least two polymer blocks each substantially made of an aromatic vinyl compound and at least one polymer block substantially made of a conjugated diene compound and wherein the polymer arms have an average apparent molecular weight greater than 125,000 and b. from 95 to 30% by weight of an elastomer (E1) having an apparent molecular weight of 120,000 to 250,000, comprising a styrenic diblock copolymer having one polymer block substantially made of an aromatic vinyl compound and one polymer block substantially made of conjugated diene compound.

2. The oil gel composition according to claim 1 wherein said aromatic vinyl compound is styrene and said conjugated diene is selected from the group consisting of isoprene and butadiene.

3. The oil gel composition according to claim 2 wherein said conjugated diene is butadiene, and wherein about 10 to about 80 mol percent of the condensed butadiene units in said at least one block substantially made of butadiene units have 1,2 configuration.

4. The oil gel composition according to claim 3 wherein the first block copolymer has a molecular weight of 300,000 to 1,500,000 if said copolymer is a radial or star polymer.

5. The oil gel composition according to claim 4 wherein the first block copolymer is selected from the group consisting of those of the formulae $(B)_p\text{-}(A\text{-}B)_2X$; or $(B)_p\text{-}A(B\text{-}A)_n\text{-}(B)_p$, (linear SBC1)

$((B)_p(A\text{-}B)_n)_mX$ (radial SBC2)

wherein A represents a polystyrene block; B represents a polymer block of a conjugated diene, n is an integer greater than or equal to 1, m is an integer greater than 2, p is 0 or 1, and X is the residue of a coupling agent or multifunctional monomer.

6. The oil gel composition according to claim 2 wherein the first block copolymer and the elastomer may be used in relative amounts of 15 to 70% by weight (SBC1 and/or SBC2) and 85 to 30% by weight (E1).

7. The oil gel composition according to claim 3 wherein said first block copolymer is an $(A\text{-}B)_nX$ block copolymer where n is an integer from 2 to about 8, X is the coupling agent residue, each A block has an average molecular weight of about 30,000 to about 40,000, each B block has an average molecular weight of about 150,000 to about 170,000, and the total styrene content in the block copolymer composition is between about 15 weight percent and about 40 weight percent.

8. The oil gel composition according to claim 7 wherein the amount of the first block copolymer is 20 to 50% by weight and the amount of the E1 polymer is 80 to 50% by weight, where E1 is an A-B diblock where the A block has an average molecular weight of about 30,000 to about 40,000 and the B block has an average molecular weight of about 150,000 to about 170,000.

9. The oil gel composition according to claim 8 wherein said extending oil is a paraffinic/naphthenic processing oil.

10. The oil gel composition according to claim 9 wherein the amount of extending oil is between about 400 and about 1000 parts by weight.

11. The oil gel composition according to claim 1 also comprising up to 30 percent by weight of a filler, based on the total amount of block copolymer.

12. An article prepared from the gel of claim 1.

13. The oil gel composition according to claim 1 wherein said conjugated diene is butadiene, and wherein about 10 to about 80 mol percent of the condensed butadiene units in said at least one block substantially made of butadiene units have 1,2 configuration.

14. The oil gel composition according to claim 1 wherein said first block copolymer is an $(A\text{-}B)_nX$ block copolymer where n is an integer from 2 to about 8, X is the coupling agent residue, each A block has an average molecular weight of about 30,000 to about 40,000, each B block has an average molecular weight of about 150,000 to about 170,000, and the total styrene content in the block copolymer composition is between about 15 weight percent and about 40 weight percent.

15. The oil gel composition according to claim 1 wherein the first block copolymer is selected from the group consisting of those of the formulae:

$(B)_p\text{-}(A\text{-}B)_2X$; or $(B)_p\text{-}A(B\text{-}A)_n\text{-}(B)_p$, (linear SBC1)

$((B)_p(A\text{-}B)_n)_mX$ (radial SBC2)

wherein A represents a polystyrene block; B represents a polymer block of a conjugated diene, n is an integer greater than or equal to 1, m is an integer greater than 2, p is 0 or 1, and X is the residue of a coupling agent or multifunctional monomer.

16. The oil gel composition according to claim 1 wherein the first block copolymer is selected from the group consisting of those formulae:

$(A\text{-}B)_2X$ $(B)_p\text{-}(A\text{-}B)_2X$ (linear SBC1)

$((B)_p(A\text{-}B)_n)_mX$ (radial SBC2)

wherein A represents a polystyrene block; B represents a polymer block of a conjugated diene, n is an integer greater than or equal to 1, m is an integer greater than 2, p is 0 or 1, and X is the residue of a coupling agent or multifunctional monomer, and wherein the diblock copolymer is co-produced with the first block copolymer.

17. The oil gel composition according to claim 1 wherein the first block copolymer is selected from the group consisting of those formulae:

$(A\text{-}B)_2X$ $(B)_p\text{-}(A\text{-}B)_2X$ (linear SBC1)

$((B)_p(A\text{-}B)_n)_mX$ (radial SBC2)

wherein A represents a polystyrene block; B represents a polymer block of a conjugated diene, n is an integer greater than or equal to 1, m is an integer greater than 2, p is 0 or 1, and X is the residue of a coupling agent or multifunctional monomer, and wherein the diblock copolymer is co-produced with the first block copolymer, and wherein the diblock copolymer has the same molecular weight as the arms in the first block copolymer.

18. The oil gel composition according to claim 1 wherein the first block copolymer is of greater molecular weight than the diblock copolymer.

* * * * *